Patented Feb. 28, 1939

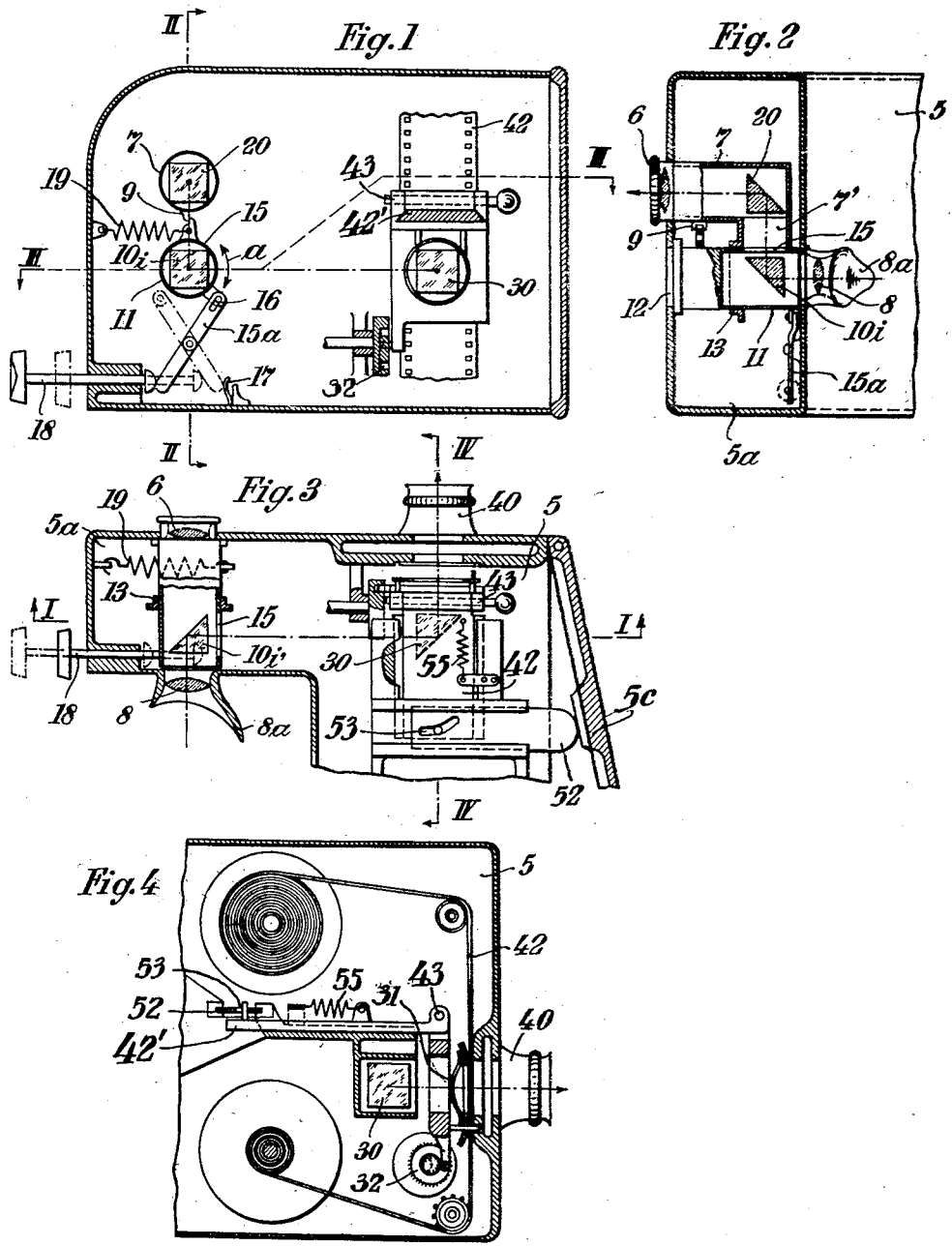

2,149,217

UNITED STATES PATENT OFFICE 2,149,217

MOTION PICTURE CAMERA

Paul Heinisch, Berlin-Zehlendorf, and Karl Schencke, Berlin-Tempelhof, Germany, assignors to Askania-Werke A. G., a corporation of Germany Application May 29, 1936, Serial No. 82,554
In Germany June 1, 1935

4 Claims. (Cl. 88—1.5)

Our invention relates to improvements in cameras for taking motion pictures on a sensitized film and having a view finder of the—what may be called—"double-purpose" type, namely which is equipped with a movable reflector, operable by the camera man, by which the eye piece of the finder can be optically associated alternately with the exposed section of the film for controlling the correct focussing of the pictures thrown thereon by the camera lens, controlling the light effects, adjusting the apertures and the like,—and with the objective of the finder proper, so as to enable the operator to accurately aim with the camera at the objects to be photographed.

Motion picture cameras so equipped are known, the finder of which because of having the form of a rather long barrel and being arranged outside the camera casing proper is subject to be damaged,—and which because of their specific shape and heavy weight must be fixed on and supported by a tripod or the like on making the exposures.

In contradistinction to motion picture cameras of the said type and design, which are difficult to handle in crowded places and too cumbersome on occasions, where the utmost speed is required in getting ready for catching the worm and taking the pictures before the chances are gone, our invention aims at providing a structurally improved motion picture camera of unusually small compass and light weight, so designed and proportioned, that the film reporter can comfortably make the exposures, while carrying the camera on his shoulder.

In connection therewith the invention aims at providing the motion picture camera with a double purpose finder of the type set forth above, but of improved design, namely being of relatively short length and safely enclosed in the casing of the camera, and at so re-designing both the camera casing and the finder, that the film reporter can comfortably look into the eye piece of the finder, and operate the movable reflector concerned.

Briefly stated our invention consists in the provision of a finder, of which the optical axes of the objective and the eye piece are in staggered position to each other, and wherein the movable reflector concerned is rotatably mounted around an axis coinciding with the optical axis of the eye piece.

Another valuable feature is the provision of a camera casing of specific cross sectional shape, namely being formed at its front end with a laterally projecting compartment or chamber integral with the camera casing proper, wherein the view finder and its actuating mechanism are mounted, and being so proportioned with regard to the operator's head and shoulders, that the eye piece of the finder is right in front of the operator's eye.

The nature and scope of this invention are briefly outlined in the appended claims and will be more fully understood from the following specification taken together with the accompanying drawing, in which the invention is diagrammatically shown by way of an example:

Fig. 1 is a section through the camera taken on a plane represented by line I—I in Fig. 3, Fig. 2 is a fragmentary section taken on line II—II in Fig. 1, Fig. 3 is another fragmentary section taken on line III—III in Fig. 1, and Fig. 4 is still another fragmentary section taken on line IV—IV in Fig. 3.

In all figures non-pertinent accessorial parts, namely which have no specific bearing on the invention have been purposely omitted.

With the object in view set forth above the motion picture camera re-designed according to this invention is provided with:

I. A finder of improved design, and

II. Reflecting means structurally associated with the finder and the picture strip and being under the operator's control.

In the embodiment of the invention shown by way of an example the finder comprises an objective 6 and an eyepiece 8, which are arranged in an auxiliary section 5a of the camera, adjacent to and forming a lateral extension of the camera casing proper 5; the optical axes of the finder objective 6 and eye-piece 8 are in staggered position to each other—the objective being at a higher level than the eye-piece.

The reflecting means concerned, which are structurally associated with the finder and are under the operators control according to this invention, comprise:

(1) A primary reflecting element—conveniently a prism 10—fulcrumed in the optical axis of the finder's eye-piece 8 and adapted to be reciprocated around its fulcrum so as to assume two different operative positions, seen in Figs. 1-3, in which the upright position is indicated by the affix $i$, while the horizontal position is indicated by $i'$, (2) Means described hereinafter in detail for revolving, namely reciprocating said primary reflecting element 10 through a quarter turn as indicated by the double pointed arrow a in Fig. 1, (3) A secondary reflecting element 20 (Figs. 1-2) such as a prism, which is centrally fixed in the rear end of the barrel 7 of the finder-objective 6, so as to re-direct the image produced thereby to said primary reflecting element 10—while the latter is in its upright position i (Fig. 1)—and thence to eye-piece 8;

(4) A third reflecting element 30—preferably a prism—fixed in the optical axis of the exposure-lens 40, namely at the rear of the exposed section of the picture strip 42 so as to re-direct the image produced thereupon to said primary reflecting element 10, viz. while the latter is in its so-called horizontal position i' shown in Fig. 3,—and thence to the eye-piece 8 of the finder.

In the embodiment of the invention shown in the drawing by way of an example said means for reciprocating the primary reflecting element 10 around its fulcrum comprise:

(1) A barrel 11, which supports said primary reflecting element 10 and is journalled at 12 in the camera casing and at 13 in the lower section 7' of barrel 7; said barrel 11 is closed at its front end 14 and provided with an aperture at 15 registering with the reflecting face of prism 10; and (2) An actuating mechanism for revolving through a quarter turn said barrel 11 and prism 10 so as to put the latter into its horizontal position i' (Fig. 3) responsive to the third reflecting element 30, and for positively restoring said prism 10 into its original upright position i (Fig. 1) responsive to the second reflecting element 20.

The actuating mechanism concerned comprises:

(1) A double armed lever 15a pivoted in the camera casing and attached to said barrel 11 by means of a pin and slot gear 16, (2) A stop 17 for limiting the motion of said lever 15 and barrel 11 respectively, (3) A trigger 18 operable by the camera man, which is slidably mounted in the camera casing; on pushing by hand said trigger 18 to the right lever 15 is moved into the position shown in dotted lines and in turn prism 10 is swung into its horizontal position i' (Fig. 3), (4) A spring 19 attached to said barrel 11 for positively restoring the prism 10 into its upright position i, (Fig. 1-2);

(5) A stop indicated at 9 for limiting the backward motion of said barrel 11.

Various changes and modifications may be conveniently made in the structural details of motion picture cameras provided with a finder and reflecting means of the improved design described, and in the assemblage and cooperation of their component parts, without departing from the spirit and the salient ideas of this invention.

For instance the eye-piece 8 of the finder may be formed to advantage with a rearwardly projecting lid or screen 8a adapted to close up a gap at the laterally and rearwardly receding portion of the socket of the operator's eye, so as to intercept trespassing rays of light, likely to intrude through said gap into the camera and to find their way to the sensitized film.

Instead of arranging the finder objective 6 at a higher level than the eye-piece, it may be conveniently arranged at the same or a lower level (not shown) consistent with specific structural requirements of the motion picture cameras concerned.

Figs. 1, 3 and 4 diagrammatically show the improved view finder in connection with a film gate of improved design as disclosed in our co-pending United States Patent application Ser. No. 82,555, filed May 29, 1936:

The carrier of the film gate 31 is reciprocated by a cam 32 and is hinged at 43 to a displacing mechanism, the latter being provided for temporarily spacing the film gate from the opposed guide member and thus facilitating the threading of a new film therebetween; said displacing mechanism comprises a primary guide block 42', slidably arranged and loaded by a spring 55, and a secondary guide block 52 cooperatively connected with the primary guide block and the camera door 56 through a pin and slot gear 53;—on closing the camera door 53 the hinged end of the film gate structure is restored by the displacing mechanism into its operative position.

What we claim is:

1. In a motion picture camera, the combination with a camera objective lens, and means for guiding film through the path of light of said objective lens; a stationary first refletcing member back of an aperture in the film guide and field of exposure at a distance from said lens greater than the focal distance therefrom; a finder objective lens; a finder eyepiece; a second stationary reflecting member between said finder eyepiece and finder objective; a third reflecting member between the finder eyepiece and the second stationary reflecting member arranged in the point of intersection of the rays of light coming from said camera objective and from said finder objective and deflected by the first and second stationary reflecting members; and means to mount said third reflecting member for rotation about an axis substantially coinciding with the optical axis of the finder to alternately deflect into said finder eyepiece light from said finder objective and from said camera objective, respectively.

2. In a motion picture camera the combination with a camera objective lens, and means for guiding film through the path of light of said objective lens; a stationariy first reflecting member back of an aperture in the film guide and field of exposure at a distance from said lens greater than the focal distance therefrom; a finder objective lens; a finder eyepiece; a second stationary reflecting member between said finder eyepiece and finder objective; a third reflecting member between the finder eyepiece and the second stationary reflecting member arranged in the point of intersection of the rays of light coming from said camera objective and from said finder objective and deflected by the first and second stationary reflecting members; means to mount said third reflecting member for rotation about an axis substantially coinciding with the optical axis of the finder; manually operable means for turning said third reflecting member alternately to deflect into said finder eyepiece light from said finder objective and from said camera objective, respectively; and a spring connected normally to maintain said third reflecting member in position to receive light from said finder objective.

3. In a motion picture camera the combination with a camera objective lens; and means for guiding film through the path of light of said objective lens; a stationary first reflecting member back of an aperture in the film guide and field of exposure at a distance from said lens greater than the focal distance therefrom; a finder objective lens; a finder eyepiece; a second stationary reflecting member between said finder eyepiece and finder objective; a third reflecting member between the finder eyepiece and the second stationary reflecting member arranged in the point of intersection of the rays of light coming from said camera objective and from said finder objective and deflected by the first and second stationary reflecting members; means to mount said third reflecting member for rotation about an axis substantially coinciding with the optical axis of the finder; means for turning said third reflecting member alternately to deflect into said finder eyepiece light from said finder objetcive and from said camera objective, respectively; and means operatively connected with said rotatable mounting means for intercepting and opening the path of light between said first and third reflecting member normally to protect the film from light entering through the finder eyepiece.

4. In a motion picture camera the combination with a camera objective lens, and means for guiding film through the path of light of said objective lens; a stationary first reflecting member back of an aperture in the film guide and field of exposure at a distance from said lens greater than the focal distance therefrom; a finder including an eyepiece, an objective and a plurality of reflecting members between the eyepiece and the objective for directing liht from said finder objective to said eyepiece; means to mount one of said last named reflecting members in the point of intersection of the rays of light coming from said camera objective and from said finder objective for rotation about an axis substantially coinciding with the optical axis of the finder alternately to deflect into said finder eyepiece light from said finder objective and from said camera objective.

PAUL HEINISCH.
KARL SCHENCKE.